(12) United States Patent
Harasaki

(10) Patent No.: US 11,217,092 B2
(45) Date of Patent: Jan. 4, 2022

(54) TRANSPORT VEHICLE SYSTEM

(71) Applicant: MURATA MACHINERY, LTD., Kyoto (JP)

(72) Inventor: Kazumi Harasaki, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 334 days.

(21) Appl. No.: 16/599,170

(22) Filed: Oct. 11, 2019

(65) Prior Publication Data
US 2020/0168082 A1    May 28, 2020

(30) Foreign Application Priority Data
Nov. 28, 2018  (JP) .............................. JP2018-222365

(51) Int. Cl.
*G08G 1/056* (2006.01)
*G08G 1/0967* (2006.01)
*B60P 1/00* (2006.01)

(52) U.S. Cl.
CPC ........... *G08G 1/056* (2013.01); *G08G 1/0967* (2013.01); *B60P 1/00* (2013.01)

(58) Field of Classification Search
CPC ......... G08G 1/056; G08G 1/0967; B60P 1/00; G05D 1/0297; G05D 2201/0216; B65G 35/00; B65G 43/00
See application file for complete search history.

(56) References Cited

U.S. PATENT DOCUMENTS

| | | | | |
|---|---|---|---|---|
| 4,902,948 A * | 2/1990 | Sherman | .............. | G05D 1/0265 318/580 |
| 4,956,777 A * | 9/1990 | Cearley | ............ | G05B 19/41895 701/24 |
| 4,994,970 A * | 2/1991 | Noji | ..................... | G05D 1/0244 180/169 |
| 5,036,935 A * | 8/1991 | Kohara | ................ | G05D 1/0265 180/168 |
| 5,091,855 A * | 2/1992 | Umehara | ............. | G05D 1/0265 701/23 |
| 5,303,154 A * | 4/1994 | Luke, Jr. | .............. | G05D 1/0265 340/438 |
| 9,845,192 B2 * | 12/2017 | Harasaki | .................. | G05D 1/02 |
| 2018/0039275 A1 * | 2/2018 | Yun | ........................ | A47L 9/1683 |

FOREIGN PATENT DOCUMENTS

JP        2013-035670 A      2/2013

* cited by examiner

*Primary Examiner* — Russell Frejd
(74) *Attorney, Agent, or Firm* — Keating & Bennett, LLP

(57) ABSTRACT

A transport vehicle system includes a controller that controls multiple transport vehicles. The controller performs, push out control to, when a transport vehicle travelling on a main route approaches a push out target vehicle, transmit a travel command to the push out target vehicle, and travel stop control, when there is no transport vehicle to which a transport command is assigned on the main route, sequentially transmit a travel stop command to the multiple transport vehicles travelling on the main route. In push out control, when there is a transport vehicle to which a transport command is assigned on the main route, a first travel command for a first distance is transmitted, and when there is no transport vehicle to which a transport command is assigned on the main route, a second travel command for a second distance smaller than the first distance is transmitted.

4 Claims, 9 Drawing Sheets

| LOOP No. | NUMBER OF VEHICLES | TRANSPORT VEHICLE No. | PRESENCE OR ABSENCE OF COMMAND |
|---|---|---|---|
| 8a | 4 | 62,64,65,67 | PRESENT |
| 8b | 2 | 61,66 | ABSENT |
| 8c | 1 | 63 | PRESENT |
| 8d | 0 | | ABSENT |
| 8e | 0 | | ABSENT |
| 8f | 0 | | ABSENT |

| MAIN LOOP No. | NUMBER OF VEHICLES | TRANSPORT VEHICLE No. | PRESENCE OR ABSENCE OF COMMAND |
|---|---|---|---|
| A | 4 | 61,65,66,67 | PRESENT |
| B | 2 | 62,64 | ABSENT |
| C | 3 | 63,68,69 | PRESENT |

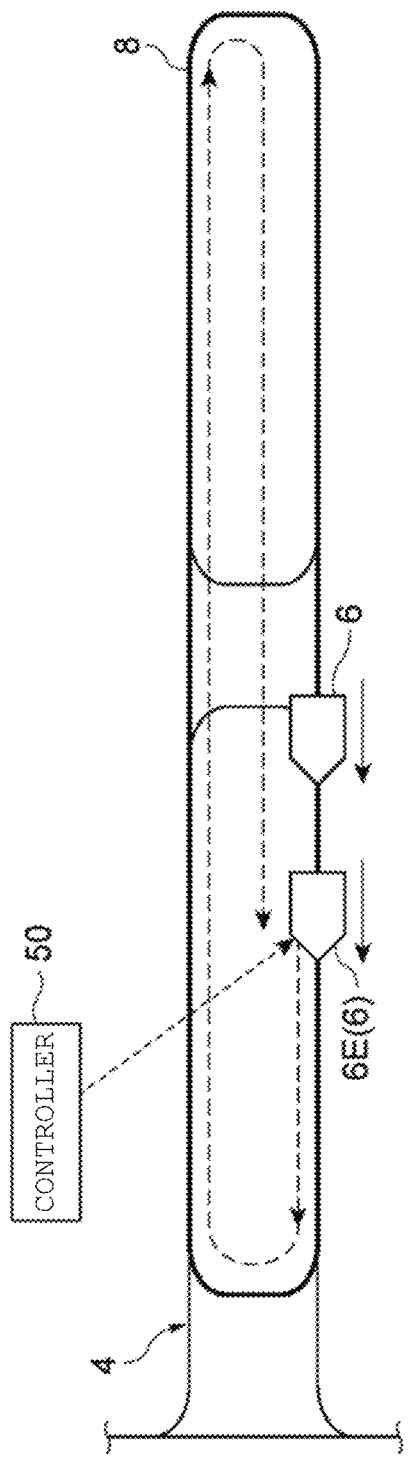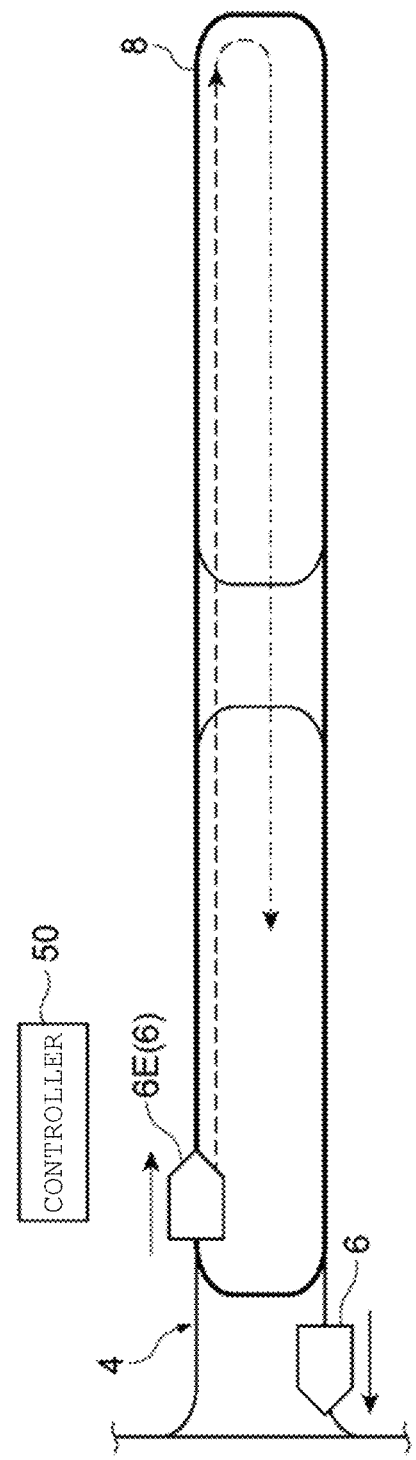

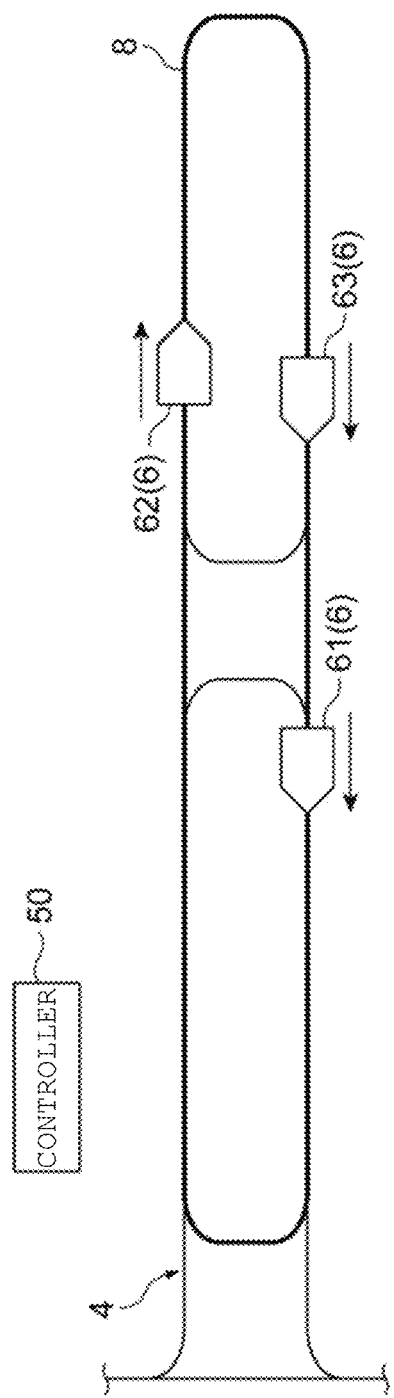
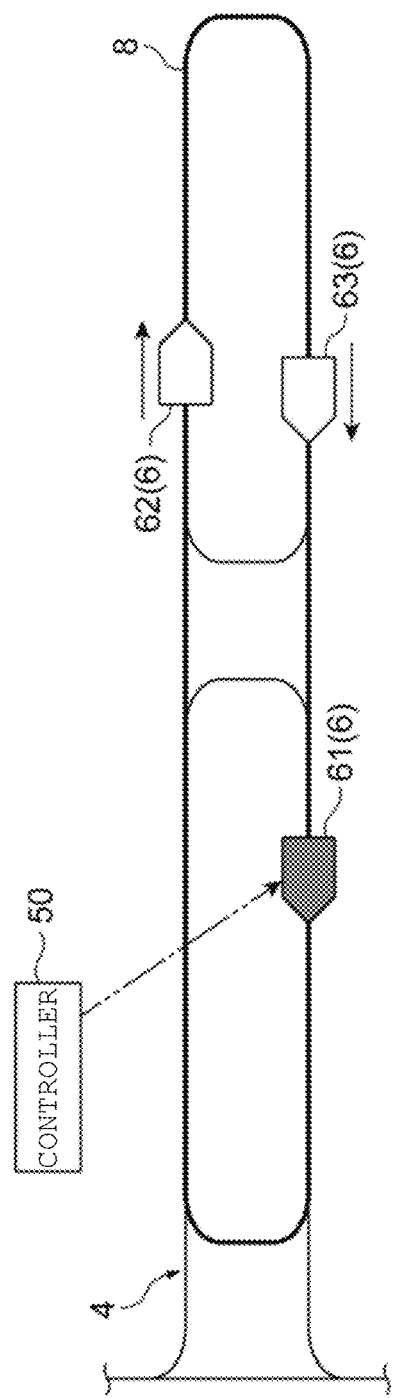

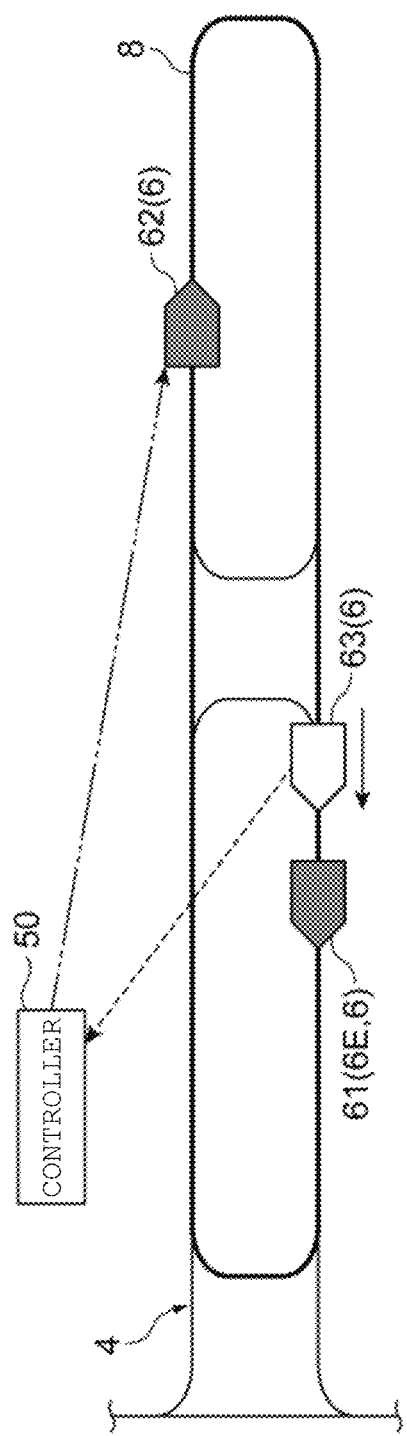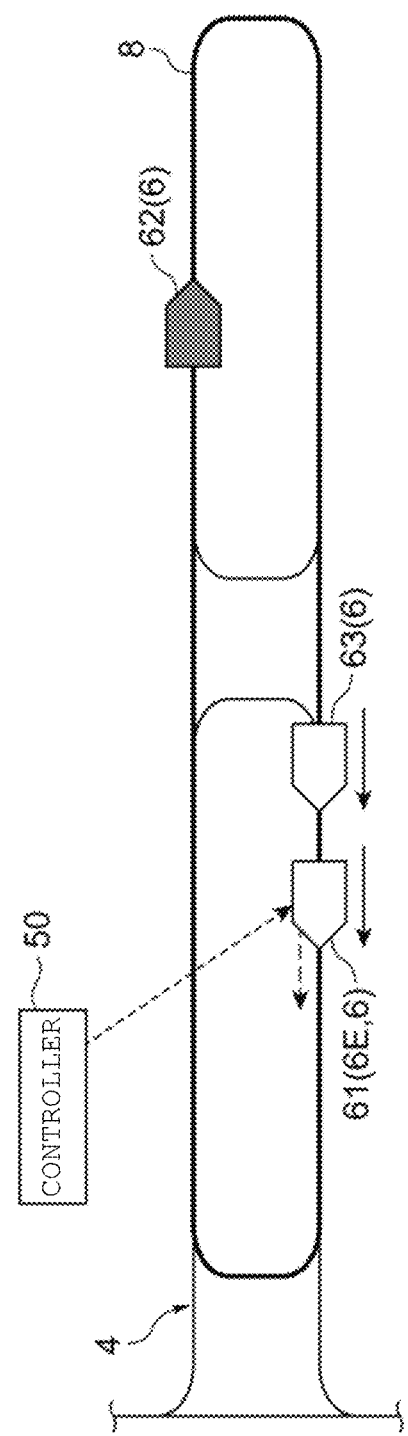

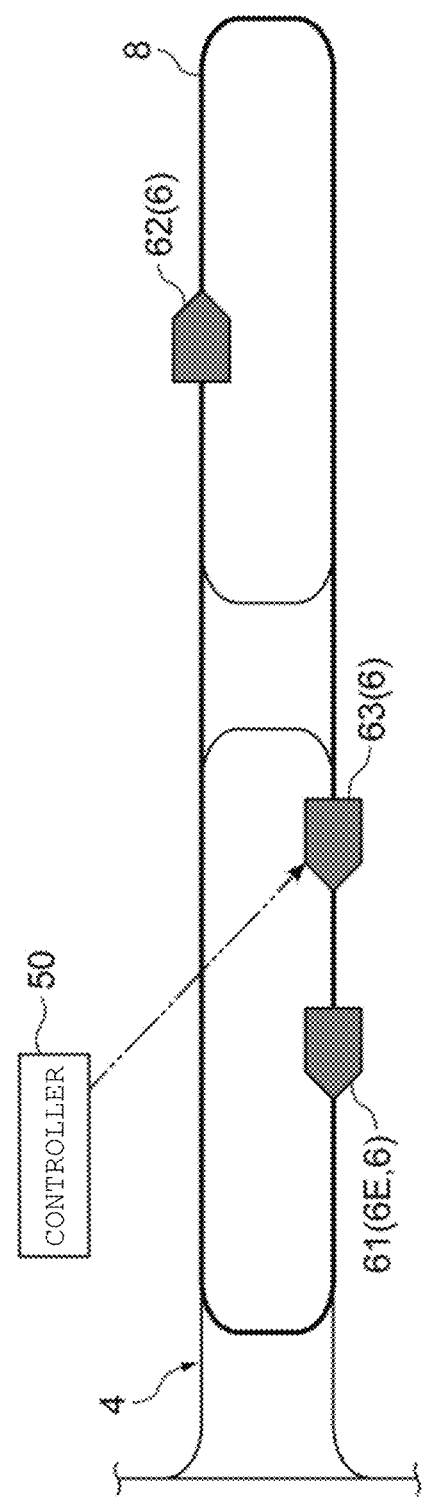

TRANSPORT VEHICLE SYSTEM

CROSS REFERENCE TO RELATED APPLICATIONS

This application claims the benefit of priority to Japanese Patent Application No. 2018-222365 filed on Nov. 28, 2018. The entire contents of this application are hereby incorporated herein by reference.

BACKGROUND OF THE INVENTION

1. Field of the Invention

The present invention relates to a transport vehicle system.

2. Description of the Related Art

Conventionally, there has been known a transport vehicle system including a controller that controls multiple transport vehicles that can travel along a predetermined route. In such a transport vehicle system, when a travelling transport vehicle approaches another transport vehicle that is stopped, push out control is performed to transmit a travel command to the other transport vehicle that is stopped.

As this type of technology, JP 2013-35670 A discloses a transport vehicle system that performs push out control in which a push out destination is specified, for example. In the transport vehicle system described in JP 2013-35670 A, a second transport vehicle that is located within a predetermined range from the current position of a first transport vehicle having a move command (transport command) and within a push out range that does not exceed the destination is detected and a push out destination is determined. In addition, a third transport vehicle that is located within a range from the current position of the second transport vehicle to the push out destination of the second transport vehicle and does not have a move command is detected and a push out destination is determined. If the third transport vehicle can arrive first at the push out destination and the second transport vehicle can arrive first at the destination except for the third transport vehicle, an instruction is given to the second transport vehicle and the third transport vehicle to travel to the push out destination.

In the transport vehicle system as described above, push out control is performed by designating a push out destination. Hence, complicated processing such as route calculation is required for the designation. As a result, the processing load or processing time may increase, for example.

Additionally, in the transport vehicle system as described above, in order to promote energy saving, there is a case of sequentially stopping travelling of multiple transport vehicles to which a transport command is not assigned in order to suppress unnecessary travel of transport vehicles. However, in this case, when sequentially stopping travel of the multiple transport vehicles, a chain of travel is caused by push out control (i.e., a travelling transport vehicle approaches another transport vehicle that is stopped to cause execution of push out control, and this push out control causes a travelling transport vehicle to approach another transport vehicle that is stopped to cause another execution of push out control, and so on), and as a result, there is a possibility that multiple transport vehicles cannot be stopped.

SUMMARY OF THE INVENTION

Preferred embodiments of the present invention provide transport vehicle systems that each is able to achieve push out control without requiring complicated processing, and to avoid a chain of travel due to push out control while reducing or preventing unnecessary travel of transport vehicles.

A transport vehicle system according to a preferred embodiment of the present invention includes a controller that controls multiple transport vehicles capable of travelling along a predetermined route. The controller performs, push out control to, when a transport vehicle travelling on a predetermined loop path included in the route approaches another transport vehicle that is stopped, transmit a travel command to the other transport vehicle that is stopped, and travel stop control to, when there is no transport vehicle to which a transport command for transporting an article is assigned on the predetermined loop path, sequentially transmit a travel stop command to stop travel to the multiple transport vehicles travelling on the predetermined loop path. In the push out control, when there is a transport vehicle to which the transport command is assigned on the predetermined loop path, a first travel command for a first distance along the predetermine loop path is transmitted as the travel command, and when there is no transport vehicle to which the transport command is assigned on the predetermined loop path, a second travel command for a second distance smaller than the first distance along the predetermined loop path is transmitted as the travel command.

In a transport vehicle system according to a preferred embodiment of the present invention, in push out control, the other transport vehicle that is stopped (hereinafter also referred to as "push out target vehicle") is caused to travel along the predetermined loop path without designating a push out destination or performing processing such as route calculation for the designation. Hence, it is possible to achieve push out control without requiring complicated processing. Additionally, when performing travel stop control and sequentially stopping travel of the multiple transport vehicles travelling on the predetermined loop path, the distance that the transport vehicles travel according to the push out control is reduced from the first distance to the second distance. Hence, it is possible to prevent another execution of push out control due to the travelling according to push out control. As a result, it is possible to avoid a chain of travel due to push out control while reducing or preventing unnecessary travel of transport vehicles.

In a transport vehicle system according to a preferred embodiment of the present invention, the first distance may be a distance of travelling the predetermined loop path. With this configuration, when there is a transport vehicle to which a transport command is assigned on the predetermined loop path, it is possible to cause the push out target vehicle to travel along the predetermined loop path by performing push out control.

In a transport vehicle system according to a preferred embodiment of the present invention, the route may include multiple predetermined loop paths. As a result, finely tuned push out control and travel stop control is able to be performed in the entire system. Hence, the effect of energy saving is enhanced.

In a transport vehicle system according to a preferred embodiment of the present invention, the transport vehicle may read multiple marks provided side by side at predetermined intervals along the route and acquire a position on the route based on the read result, and the second distance may be a distance corresponding to the interval between the multiple marks. As a result, the second distance is able to be reduced or minimized, and a chain of travel due to push out control is able to be reliably avoided.

According to preferred embodiments of the present invention, it is possible to provide transport vehicle systems that achieve push out control without requiring complicated processing, and avoid a chain of travel due to push out control while reducing or preventing unnecessary travel of transport vehicles.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 6A is a schematic plan view showing a state continued from FIG. 5B; and FIG. 6B is a schematic plan view showing a state continued from FIG. 6A.

FIG. 7A is a schematic plan view showing another example of processing performed in the transport vehicle system of FIG. 1; and FIG. 7B is a schematic plan view showing a state continued from FIG. 7A.

FIG. 8A is a schematic plan view showing a state continued from FIG. 7B; and FIG. 8B is a schematic plan view showing a state continued from FIG. 8A.

FIG. 9 is a schematic plan view showing a state continued from FIG. 8B.

DETAILED DESCRIPTION OF THE PREFERRED EMBODIMENTS

Figure 1:
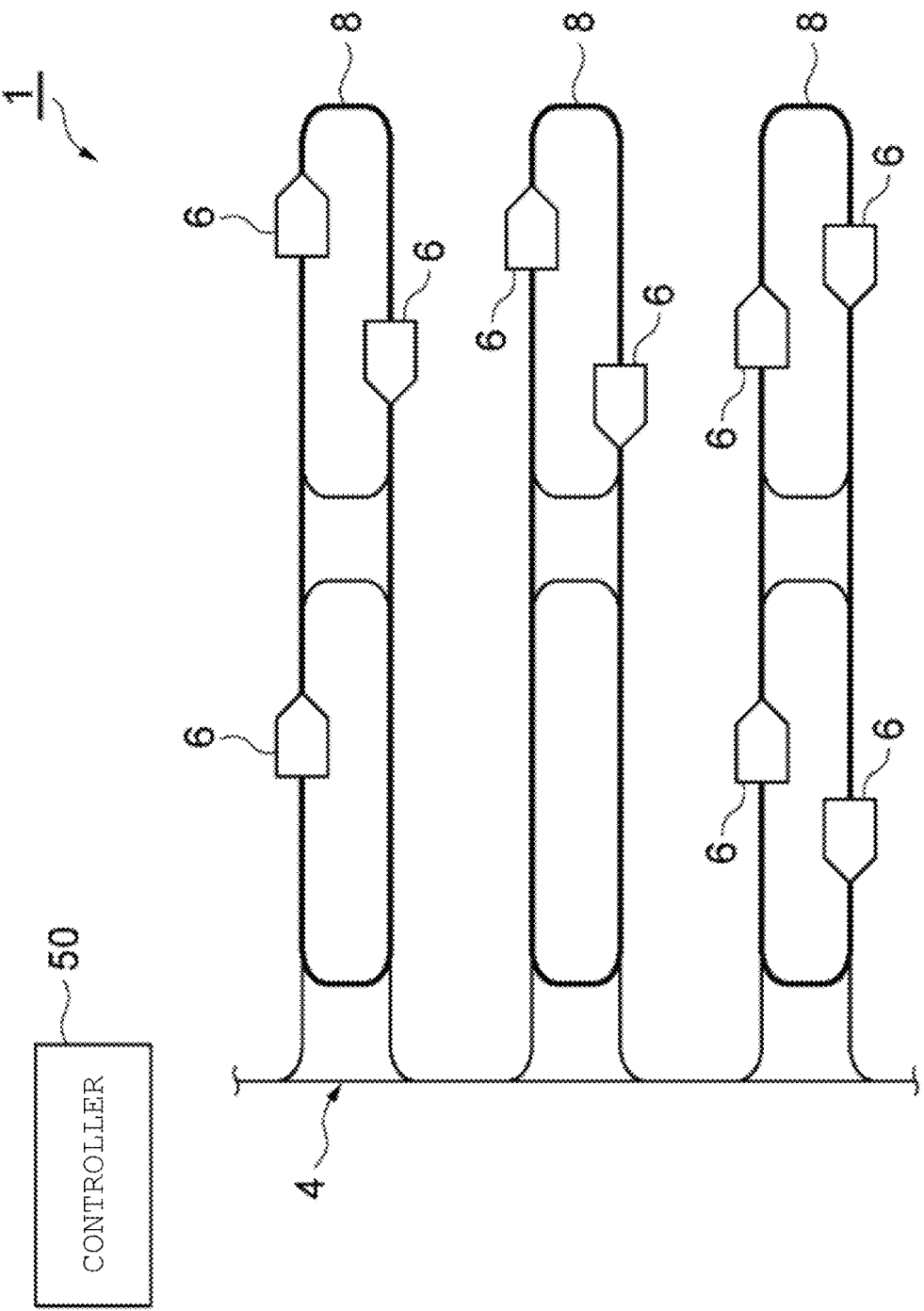
FIG. 1 is a schematic plan view showing a transport vehicle system according to a preferred embodiment of the present invention.

Hereinafter, preferred embodiments will be described with reference to the drawings. In the description of the drawings, the same elements are denoted by the same reference numerals, and redundant description is omitted. The dimensional proportions in the drawings do not necessarily coincide with those in the description.

Figure 2:
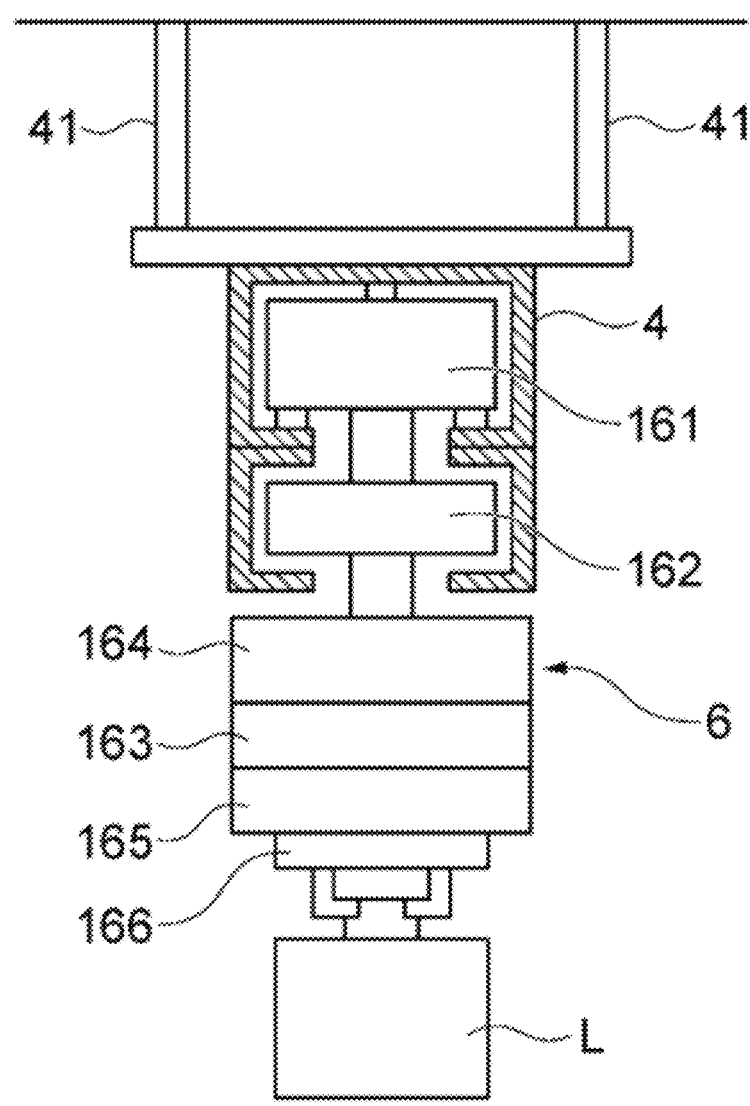
FIG. 2 is a side view showing a transport vehicle of the transport vehicle system of FIG. 1.

As shown in FIGS. 1 and 2, a transport vehicle system 1 is a system for transporting an article L in a semiconductor factory, for example. The article L is a container that stores multiple semiconductor wafers, for example, but may be a container that stores glass substrates or general components, or may be an article other than a container. The transport vehicle system 1 includes a track 4, a transport vehicle 6, and a controller 50.

The track 4 is a predetermined route on which the transport vehicle 6 travels. The track 4 preferably is laid near the ceiling, which is an overhead space of an operator working on the floor of a semiconductor factory, for example. The track 4 is suspended from the ceiling. The track 4 is supported by a strut 41. Multiple point marks (marks) are attached to the track 4 so as to be positioned at predetermined intervals along the extending direction of the track 4. Examples of the point mark include a barcode. The track 4 includes straight and curved routes. The route of the track 4 is a one-way route in which the transport vehicle 6 travels only in one direction.

The track 4 includes multiple main routes 8. The main route 8 is a loop-shaped loop path (predetermined loop path). In other words, the main route 8 is an endless or closed curve route. The multiple main routes 8 are connected to each other. The layout (shape, configuration, and the like) of the track 4 is not particularly limited, and various layouts can be adopted.

The transport vehicle 6 is a vehicle that can travel along the track 4, that is, a vehicle that can travel along a predetermined route. The transport vehicle 6 transports the article L. The transport vehicle 6 is an overhead travelling unmanned transport vehicle. The transport vehicle 6 is also referred to as a carriage (transport carriage), an overhead travelling vehicle (overhead travelling carriage), or a travelling vehicle (travelling carriage), for example. The number of transport vehicles 6 included in the transport vehicle system 1 is not particularly limited, and there are multiple transport vehicles 6.

The transport vehicle 6 includes a travelling portion 161 and a power receiving communication portion 162. The travelling portion 161 causes the transport vehicle 6 to travel along the track 4. The power receiving communication portion 162 receives power from the track 4 side by non-contact power supply, for example. The transport vehicle 6 communicates with the controller 50 through a communication line (feeder line) provided along the track 4. Alternatively, the transport vehicle 6 may communicate with the controller 50 using a power supply line of the track 4 or the like. The transport vehicle 6 includes a θ drive 163, and a lateral feeder 164 to feed a portion below the θ drive 163 laterally with respect to the track 4. The θ drive 163 controls the posture of the article L by turning an elevation driver 165 in a horizontal plane. The elevation driver 165 raises and lowers a platform 166 that holds the article L. The platform 166 is provided with a chuck so that the article L can be held or released freely. Note that the lateral feeder 164 and the θ drive 163 are not essential.

The transport vehicle 6 includes a position acquisition portion (not shown) that acquires position information regarding the position of the transport vehicle 6 on the track 4. The position acquisition portion includes a reader that reads a point mark on the track 4, an encoder, and the like. The position information on the transport vehicle 6 includes information on a point mark acquired by the reader, and information regarding a travel distance after passing the point mark, for example.

The controller 50 is an electronic control unit including a central processing unit (CPU), a read only memory (ROM), a random access memory (RAM), and the like. The controller 50 can be configured as software that is executed by the CPU by loading a program stored in the ROM on the RAM, for example. The controller 50 may be configured as hardware including an electronic circuit and other components. The controller 50 may include one device or multiple devices. When the controller 50 includes multiple devices, the devices are connected through a communication network such as the Internet or an intranet, so that one controller 50 is logically constructed.

The controller 50 communicates with multiple transport vehicles 6 in a jurisdiction area, and controls the multiple transport vehicles 6. The controller 50 performs wired or wireless communication with a host controller (not shown). The controller 50 receives a transport command to cause the transport vehicle 6 to transport the article L from the host controller. The controller 50 assigns the received transport command to an empty transport vehicle 6. An empty transport vehicle 6 is a transport vehicle 6 to which a transport command is not assigned, and includes an empty transport vehicle 6 that is not transporting the article L.

Figures 3A, 3B:
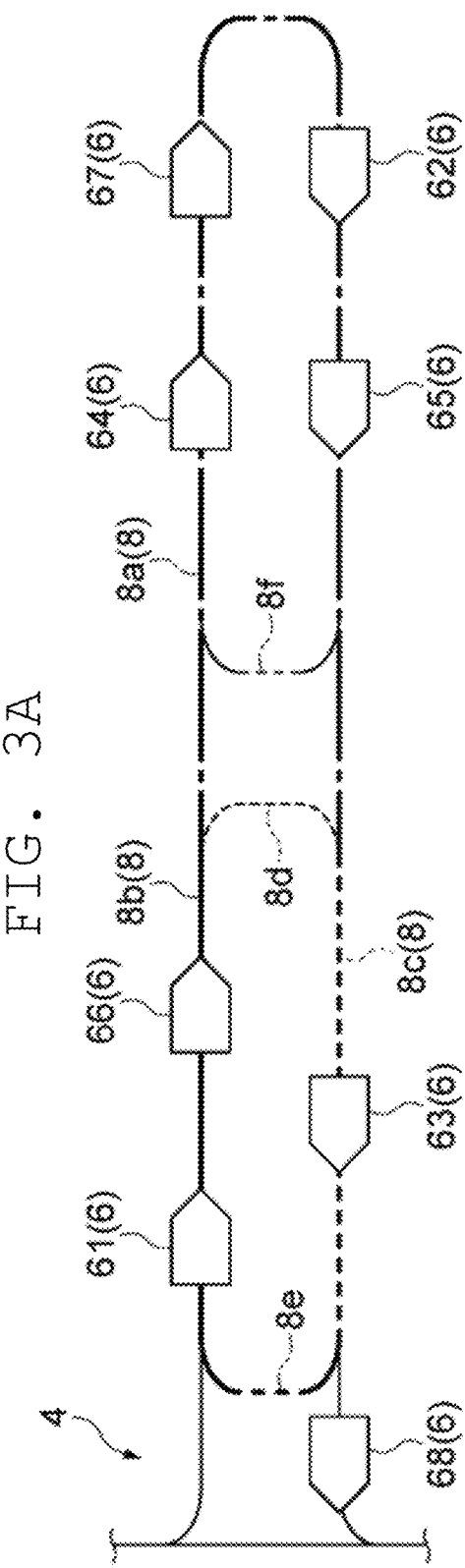
FIG. 3A is a schematic plan view for describing the construction of a main route in the transport vehicle system of FIG. 1.
FIG. 3B is a table showing information on transport vehicles existing in each route in the situation of FIG. 3A.

As shown in FIG. 3A, the controller 50 constructs route data to be the main route 8 by route search processing when reading layout data that is data regarding the layout of the track 4. Route search processing may also be executed when layout data is updated. For example, in the example shown in FIG. 3A, the route of the main route 8 includes a route 8a, a route 8c, a route 8e, a route 8b, and a route 8a. A route 8d is a sub route and is not included in the main route 8.

The controller 50 performs periodic communication with multiple transport vehicles 6 in the jurisdiction area. For example, the controller 50 transmits a status query to the transport vehicle 6 in the jurisdiction area, and the transport vehicle 6 that receives the status query transmits a status report including its own position information, speed information, and the like to the controller 50. The controller 50 periodically performs such communication with the multiple transport vehicles 6 to grasp the states of the multiple transport vehicles 6 in the jurisdiction area (including the current position and whether the vehicle is stopped or travelling).

The controller 50 tabulates information regarding whether there is a transport vehicle 6 to which a transport command is assigned, for each route of the main route 8. Thus, the controller 50 generates a table data t shown in FIG. 3B, for example. In the example shown in FIG. 3B, the table data t includes, for each of the routes 8a to 8e of the main route 8, the number of existing transport vehicles 6, the numbers of the existing transport vehicles 6, and information on whether there is a transport vehicle 6 to which a transport command is assigned. In the route 8a, there are four transport vehicles 62, 64, 65, and 67, and there is a transport vehicle 6 to which a transport command is assigned. In the route 8b, there are two transport vehicles 61 and 66, and there is no transport vehicle 6 to which a transport command is assigned. In the route 8c, there is one transport vehicle 63, and there is a transport vehicle 6 to which a transport command is assigned. In the routes 8d, 8e, and 8f, there is no transport vehicle 6 and, of course, there is no transport vehicle 6 to which a transport command is assigned, either. The controller 50 updates such table data t every time a status report is received from each transport vehicle 6.

The controller 50 performs the above-described tabulation for each of the multiple main routes 8 included in the track 4. As a result, table data TA (see FIG. 4B) regarding whether there is a transport vehicle 6 to which a transport command is assigned in each of the multiple main routes 8 is generated. Based on the generated table data TA, the controller 50 determines whether there is a transport vehicle 6 to which a transport command is assigned in each of the multiple main routes 8.

Figures 4A, 4B:
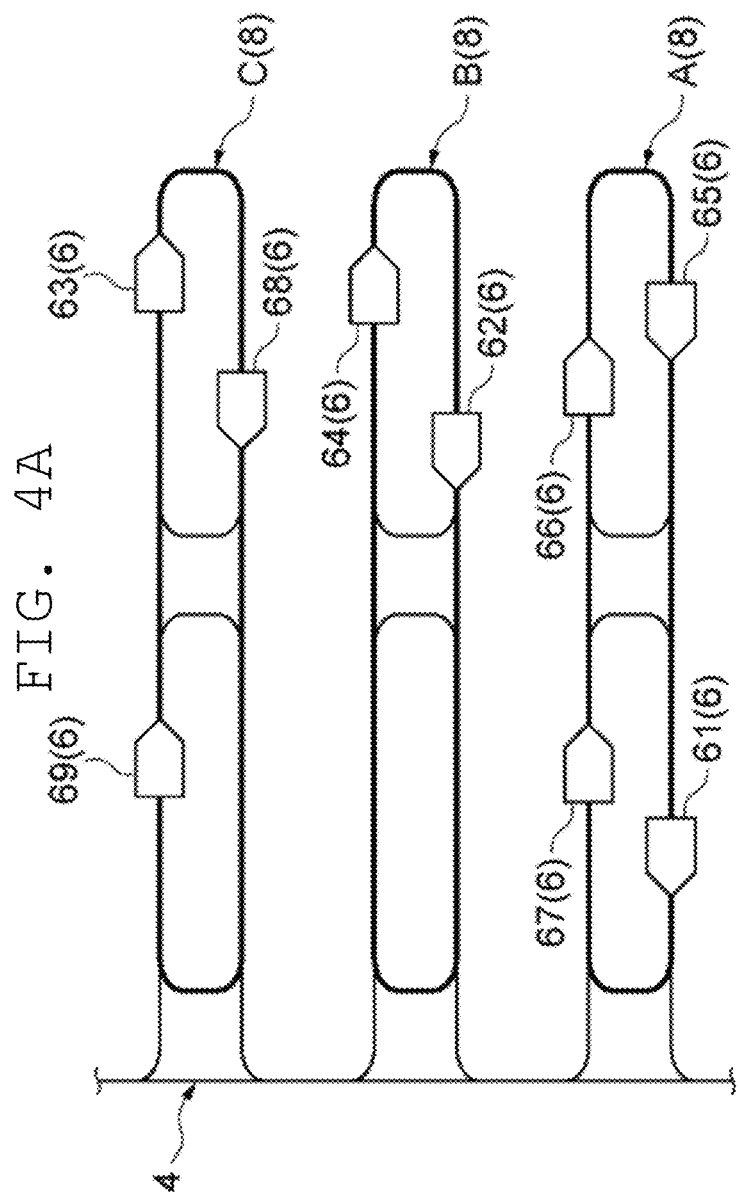
FIG. 4A is a schematic plan view showing an example of positions of transport vehicles in the transport vehicle system of FIG. 1.
FIG. 4B is a table showing information on transport vehicles existing in each of multiple main routes in the situation of FIG. 4A.

In the example shown in FIGS. 4A and 4B, the table data TA includes, for each of the multiple main routes A to C, the number of existing transport vehicles 6, the numbers of the existing transport vehicles 6, and information on whether there is a transport vehicle 6 to which a transport command is assigned. The controller 50 updates such table data TA every preset time (e.g., five seconds). The set time related to the update interval can be arbitrarily changed. In the example shown in FIGS. 4A and 4B, in the main route A, there are four transport vehicles 61, and 65 to 67 as the transport vehicle 6, and there is a transport vehicle 6 to which a transport command is assigned. In the main route B, there are two transport vehicles 62 and 64 as the transport vehicle 6, and there is no transport vehicle 6 to which a transport command is assigned. In the main route C, there are three transport vehicles 63, 68, and 69 as the transport vehicle 6, and there is a transport vehicle 6 to which a transport command is assigned.

When the transport vehicle 6 travelling on the main route approaches a push out target vehicle 6E, which is another transport vehicle 6 that is stopped, the controller 50 performs push out control of transmitting a travel command to the push out target vehicle 6E that is stopped.

Push out control is control for moving (pushing out) the push out target vehicle 6E so that the push out target vehicle 6E does not obstruct travel of the transport vehicle 6 approaching from behind. Push out control is performed when the travelling transport vehicle 6 approaches the push out target vehicle 6E to a certain inter-vehicle distance or less. Specifically, when the travelling transport vehicle 6 approaches the push out target vehicle 6E to a certain distance, a push out request is transmitted from the travelling transport vehicle 6 to the controller 50. Upon receipt of the push out request, the controller 50 performs push out control of the push out target vehicle 6E. For example, when there is another transport vehicle 6 that is stopped between the travelling transport vehicle 6 and the closest point mark in front of the transport vehicle 6, a push out request regarding the other transport vehicle 6 that is stopped as a push out target vehicle 6E is communicated between the travelling transport vehicle 6 and the controller 50.

When there is no longer a transport vehicle 6 to which a transport command is assigned on the main route 8, the controller 50 performs travel stop control of sequentially transmitting a travel stop command to stop travel to multiple transport vehicles 6 travelling on the main route 8. In travel stop control, a travel stop command is transmitted to the multiple transport vehicles 6 in the order of entering the main route 8. The order in which the multiple transport vehicles 6 entered the main route 8 is stored in the controller 50.

In the controller 50 of the present preferred embodiment, in push out control, when there is a transport vehicle 6 to which a transport command is assigned on the main route 8, a first travel command for a first distance along the main route 8 is transmitted as a travel command. In push out control, when there is no transport vehicle 6 to which a transport command is assigned on the main route 8, a second travel command for a second distance smaller than the first distance along the main route 8 is transmitted as a travel command.

The first distance is a distance of travelling the main route 8 (a distance corresponding to one lap of the main route 8). That is, the first travel command is a travel command to cause the push out target vehicle 6E to travel along the main route 8. The second distance is a distance (one point distance) corresponding to an interval between multiple point marks. That is, the second travel command is a travel command to move the push out target vehicle 6E to the downstream side of the main route 8 by one point distance. The first distance and the second distance are designated and set in advance.

Next, an example of processing performed in the transport vehicle system 1 will be specifically described. Note that in the following, one main route 8 among the multiple main routes 8 will be described.

Figure 5A:
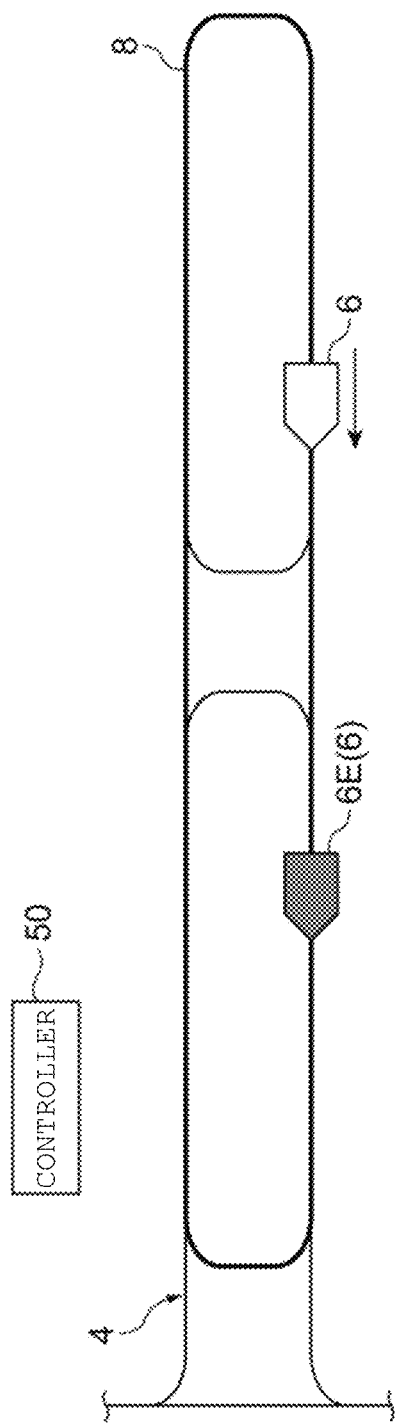
FIG. 5A is a schematic plan view showing an example of processing performed in the transport vehicle system of FIG. 1.

In the situation shown in FIG. 5A, on the main route 8, the transport vehicle 6 to which a transport command is assigned travels, and the push out target vehicle 6E is stopped in front of the transport vehicle 6 to which the transport command is assigned. In this situation, the controller 50 refers to the table data TA (see FIG. 4B) updated every set time, and determines that there is a transport vehicle 6 to which a transport command is assigned on the main route 8.

Figure 5B:
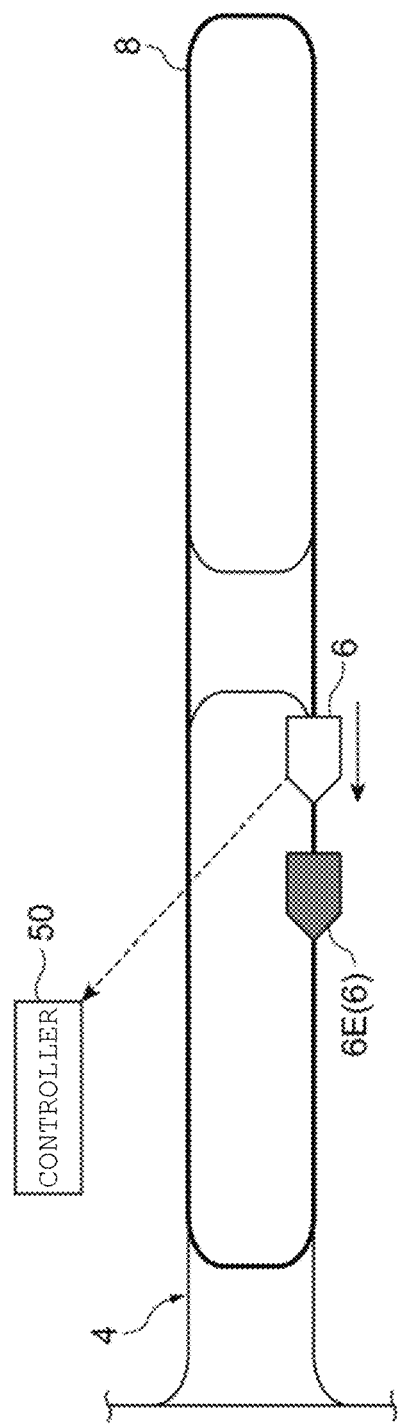
FIG. 5B is a schematic plan view showing a state continued from FIG. 5A.

As shown in FIG. 5B, the transport vehicle 6 to which a transport command is assigned advances, the travelling transport vehicle 6 approaches the push out target vehicle 6E to a certain distance, and the travelling transport vehicle 6 transmits a push out request to the controller 50. With this, the controller 50 starts push out control for the push out target vehicle 6E.

In push out control, as shown in FIG. 6A, in response to the determination result that there is a transport vehicle 6 to which a transport command is assigned on the main route 8, the first travel command for the first distance along the main route 8 is transmitted as a travel command to the push out target vehicle 6E. Here, the first distance is the distance of a lap of the main route 8. As a result, as shown in FIG. 6B, the push out target vehicle 6E travels along the main route 8, and the transport vehicle 6 to which a transport command is assigned leaves the main route 8 and achieves smooth transportation without being obstructed by the push out target vehicle 6E.

On the other hand, in the situation shown in FIG. 7A, in the main route 8, there is no transport vehicle 6 to which a transport command is assigned, and multiple transport vehicles 6 (three transport vehicles 61, 62, and 63 in this example) are travelling around the main route 8. In this situation, the controller 50 refers to the table data TA (see FIG. 4B) updated every set time, and determines that there is no transport vehicle 6 to which a transport command is assigned on the main route 8. In response to the determination result that there is no transport vehicle 6 to which a transport command is assigned on the main route 8, the controller 50 starts travel stop control of sequentially stopping the multiple travelling transport vehicles 6.

In travel stop control, as shown in FIG. 7B, a travel stop command to stop travel is transmitted to the transport vehicle 61 travelling on the main route 8. This stops travel of the transport vehicle 61. Subsequently, as shown in FIG. 8A, a travel stop command to stop travel is transmitted to the transport vehicle 62 travelling on the main route 8. This stops travel of the transport vehicle 62.

Here, while the travel stop command is transmitted to the travelling transport vehicle 62, the travelling transport vehicle 63 catches up with the stopped transport vehicle 61 and approaches the transport vehicle 61 to a certain distance. Hence, a push out request is transmitted from the travelling transport vehicle 63 to the controller 50. With this, the controller 50 starts push out control regarding the transport vehicle 61 as the push out target vehicle 6E.

In push out control, as shown in FIG. 8B, in response to the determination result that there is no transport vehicle 6 to which a transport command is assigned on the main route 8, the second travel command for the second distance along the main route 8 is transmitted as a travel command to the push out target vehicle 6E. Here, the second distance is a distance corresponding to an interval between point marks attached to the track 4.

As a result, as shown in FIG. 9, the push out target vehicle 6E travels a short distance along the main route 8 and stops. During such travel and stop of the push out target vehicle 6E according to push out control, the controller 50 continues to perform travel stop control, and transmits a travel stop command to stop travel to the transport vehicle 63 travelling on the main route 8. As described above, on the main route 8 where there is no transport vehicle 6 to which a transport command is assigned, all the transport vehicles 61 to 63 are stopped.

As described above, in the transport vehicle system 1, in push out control, the push out target vehicle 6E is caused to travel along the main route 8 without designating a push out destination or performing processing such as route calculation for the designation. Hence, it is possible to achieve push out control without requiring complicated processing. Additionally, when performing travel stop control and sequentially stopping travel of multiple transport vehicles 6 travelling on the main route 8, the distance that the transport vehicles 6 travel according to the push out control is reduced from the first distance to the second distance. Hence, it is possible to reduce or prevent approaching of the transport vehicle 6 travelling according to push out control to the transport vehicle 6 that is stopped, and to prevent another execution of push out control due to the travelling according to push out control. As a result, while reducing or preventing unnecessary travel of transport vehicles 6, it is possible to avoid the chain of travel caused by push out control (i.e., a travelling transport vehicle 6 approaches the push out target vehicle 6E to cause execution of push out control, and this push out control causes a travelling transport vehicle 6 to approach another push out target vehicle 6E to cause another execution of push out control, and so on).

In the transport vehicle system 1, the first distance in push out control is a distance of travelling the main route 8. Accordingly, when there is a transport vehicle 6 to which a transport command is assigned on the main route 8, it is possible to cause the push out target vehicle 6E to travel along the main route 8 by performing push out control. The transport vehicle 6 to which a transport command is assigned is able to achieve transportation smoothly without being obstructed by the push out target vehicle 6E. The push out target vehicle 6E travels in the main route 8, so that it is easy to capture the subsequent transport command.

In the transport vehicle system 1, the track 4 includes multiple main routes 8. As a result, finely tuned push out control and travel stop control is able to be performed in the entire system. Hence, the effect of energy saving is enhanced.

In the transport vehicle system 1, the transport vehicle 6 reads multiple point marks provided side by side at predetermined intervals along the track 4, and acquires a position on the track 4 on the basis of the read result. The second distance in push out control is a distance (one point distance) corresponding to the interval between the multiple point marks. Accordingly, it is possible to reduce or minimize the second distance in terms of system control, and to reliably avoid a chain of travel due to push out control.

In the transport vehicle system 1, by performing travel stop control, a travel stop command is sequentially transmitted to multiple travelling transport vehicles 6 without using a broadcast method of simultaneously transmitting a travel stop command to multiple travelling transport vehicles 6. Hence, the controller 50 is able to reliably receive an OK report returned from each of the multiple transport vehicles 6 in response to the transmission of the travel stop command.

As mentioned above, while preferred embodiments of the present invention have been described, the present invention is not limited to the above preferred embodiments, and various changes can be made without departing from the gist of the present invention.

In the above preferred embodiments, the first distance and the second distance in push out control are not particularly limited. The first distance may be various distances, and the second distance may be various distances as long as the distance is smaller than the first distance. The first distance may be a substantially infinite length, and in this case, the first travel command may substantially be an instruction for continuing to travel along the main route 8.

In the above preferred embodiments, an overhead travelling unmanned transport vehicle is used as the transport vehicle 6. However, the transport vehicle 6 is not particularly limited. The transport vehicle 6 may be an overhead travelling shuttle. The transport vehicle 6 may be a tracked unmanned transport vehicle that can travel along a track on the floor. The transport vehicle 6 may be a magnetic induction unmanned transport vehicle that can travel along a path made of magnetic tape or the like. The transport vehicle 6 may be a laser guided unmanned transport vehicle that can travel along a predetermined route by being guided by laser light.

In the above preferred embodiments, processing related to one main route 8 has been described as an example. However, similar processing can be performed for other main routes 8 as well. In the above preferred embodiments, one or multiple other controllers that relay between the controller 50 and the transport vehicle 6 may be provided. The material and shape of each configuration in the above preferred embodiments are not particularly limited, and various materials and shapes are applicable.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A transport vehicle system comprising:
   a controller that controls a plurality of transport vehicles capable of travelling along a predetermined route; wherein
   the controller is configured or programmed to perform:
   push out control to, when a transport vehicle travelling on a predetermined loop path included in the route approaches another transport vehicle that is stopped, transmit a travel command to the other transport vehicle that is stopped; and
   travel stop control, when there is no transport vehicle to which a transport command to transport an article is assigned on the predetermined loop path, sequentially transmit a travel stop command to stop travel to the plurality of transport vehicles travelling on the predetermined loop path; and
   in the push out control:
   when there is a transport vehicle to which the transport command is assigned on the predetermined loop path, a first travel command for a first distance along the predetermined loop path is transmitted as the travel command; and
   when there is no transport vehicle to which the transport command is assigned on the predetermined loop path, a second travel command for a second distance smaller than the first distance along the predetermined loop path is transmitted as the travel command.

2. The transport vehicle system according to claim 1, wherein the first distance is a distance of travelling the predetermined loop path.

3. The transport vehicle system according to claim 1, wherein the route includes a plurality of the predetermined loop paths.

4. The transport vehicle system according to claim 1, wherein
   the transport vehicle reads a plurality of marks provided side by side at predetermined intervals along the route, and acquires a position on the route based on the read result; and
   the second distance is a distance corresponding to one of the predetermined intervals between the plurality of marks.

* * * * *